(12) United States Patent
Kato

(10) Patent No.: US 7,499,609 B2
(45) Date of Patent: Mar. 3, 2009

(54) OPTICAL SWITCH

(75) Inventor: Yoshichika Kato, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 17 days.

(21) Appl. No.: 11/809,616

(22) Filed: May 31, 2007

(65) Prior Publication Data

US 2007/0278312 A1 Dec. 6, 2007

(30) Foreign Application Priority Data

Jun. 5, 2006 (JP) ............................. 2006-155895

(51) Int. Cl.
*G02B 6/26* (2006.01)
(52) U.S. Cl. .................. 385/18; 385/15; 385/16; 385/17; 385/46; 385/47; 385/147; 235/462.36; 235/462.37
(58) Field of Classification Search .................. 385/16, 385/18, 46, 47, 147, 15, 17
See application file for complete search history.

(56) References Cited

U.S. PATENT DOCUMENTS 6,389,189 B1 * 5/2002 Edwards et al. ............... 385/18
6,430,343 B1 * 8/2002 Arney et al. .................. 385/48
2005/0069246 A1 * 3/2005 Kato et al. .................... 385/18

FOREIGN PATENT DOCUMENTS

JP 2004-354458 12/2004
JP 2005-037885 2/2005

* cited by examiner

*Primary Examiner*—Brian Healy
*Assistant Examiner*—Hung Lam
(74) *Attorney, Agent, or Firm*—David N. Lathrop, Esq.; Gallagher & Lathrop

(57) ABSTRACT

A blocking portion is provided at an end of the mirror to prevent a light beam emitted from an input port from being transmitted to or reflected by first and second output ports. The mirror is inserted to a position where the end of the blocking portion of the mirror reaches a boundary P2' on the insertion side of an area to be blocked to obtain a permissible crosstalk value of the light beam. The mirror is removed to a position where the rear end of the blocking portion of the mirror reaches a boundary P2 on the removal side of the area to be blocked. The mirror is movably driven between the removal position and the insertion position in the optical path of a first light beam by a drive. Thus it is possible to reduce the length of the driving stroke of the mirror.

19 Claims, 11 Drawing Sheets

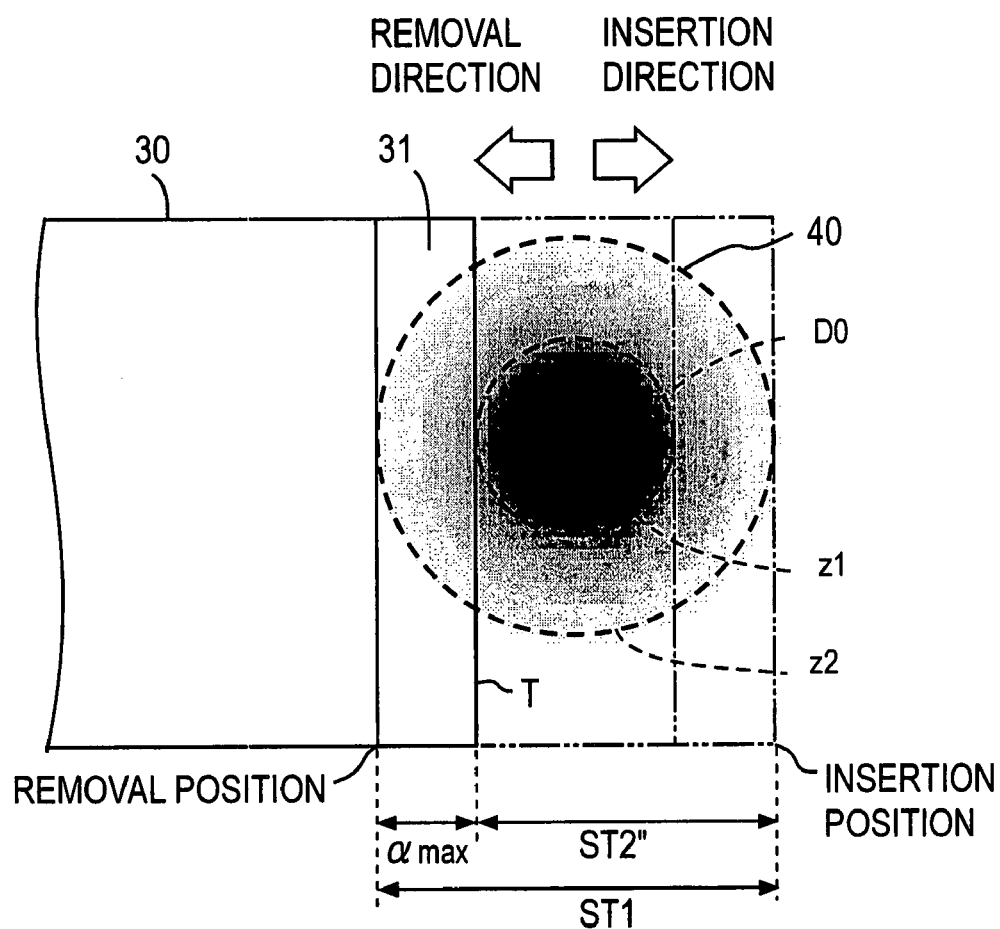

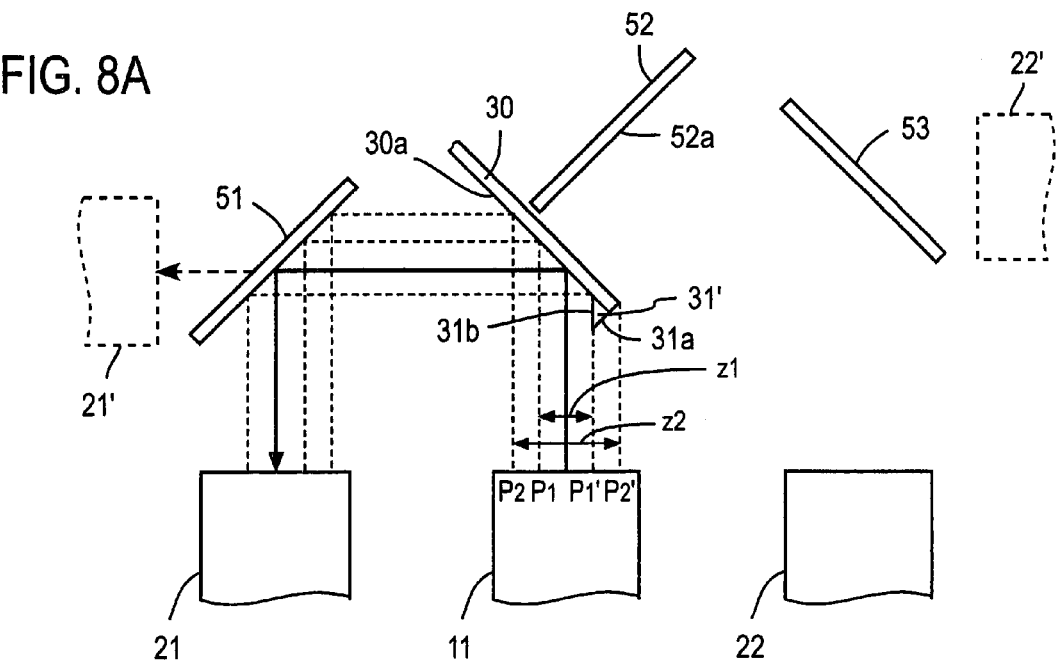
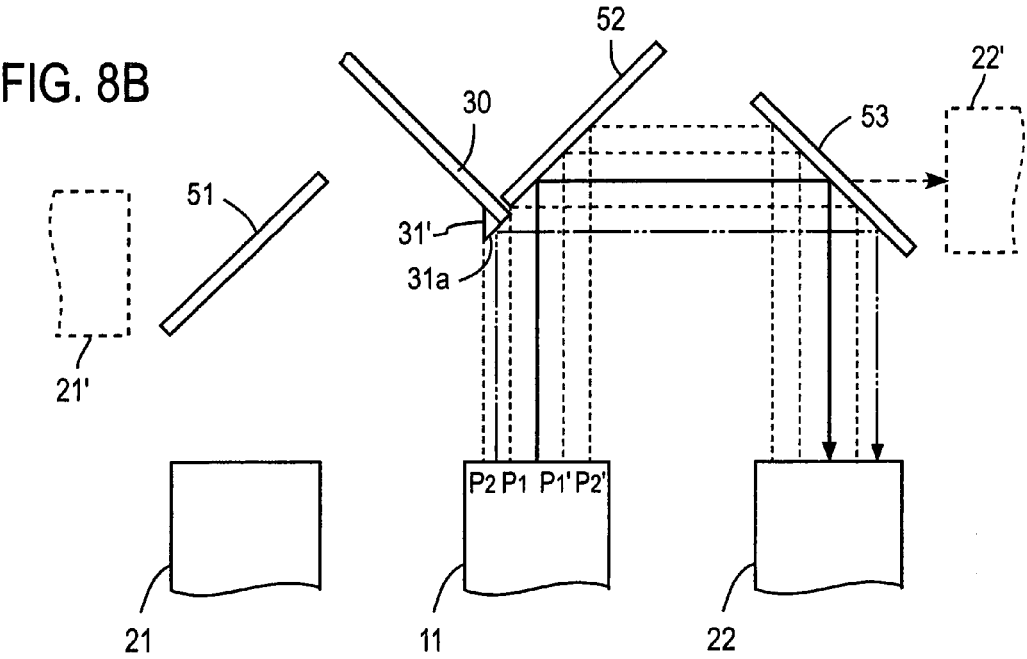

OPTICAL SWITCH

TECHNICAL FIELD

The present invention relates to an optical switch for switching optical paths by inserting and removing a mirror in and from the optical path of a light beam emitted from at least one input port to at least one output port.

BACKGROUND ART

As shown in FIG. 1, this kind of optical switch includes at least one input port 11 to which a light beam generated outside is inputted through, for example, an optical fiber and the like and from which the light beam is emitted, a mirror 30 driven while being inserted and removed in and from the optical path of a light beam 40 emitted from the input port 11, first and second output ports 21 and 22 for receiving the light beam from the input port and outputting the light beam to the outside, and a drive 35 for driving the mirror. In the present invention, since a light beam is supplied to the input port 11 from the outside, the input port 11 is referred to as an input port. However, in reality, the input port 11 emits the supplied light beam. Although the light beam is incident on the output ports 21 and 22, the output ports 21 and 22 are referred to as output ports because the output ports 21 and 22 output the supplied light beam to the outside. The following is an example where a mirror is used as a reflector.

When the mirror 30 is inserted in an optical path, the light beam 40 emitted from the input port 11 is reflected by the mirror 30 and is coupled to the first output port 21. Further, when the mirror 30 is removed from the optical path, the light beam from the input port 11 travels straight as it is and is coupled to the second output port 22. In this way, in this kind of optical switch, the mirror 30 is inserted and removed to switch outputs to the first output port 21 and the second output port 22. A solid line arrow in FIG. 1 indicates the optical axis of the light beam 40 emitted from the input port and dotted lines extending in parallel with respect to the solid line arrow indicate the beam diameter of the light beam.

In this optical switch, when inserted, the mirror 30 has to sufficiently reflect the light beam and couple the light beam to the first output port 21 to reduce an insertion loss. Further, for the second output port 22, the mirror 30 has to sufficiently block the light beam to prevent crosstalk to the second output port. However, it is not possible to perfectly prevent crosstalk and thus a reduction in crosstalk will be described in the following explanation. When removed, the mirror 30 has to sufficiently allow coupling of the light beam to the second output port 22 to reduce an insertion loss and has to prevent reflection toward the first output port 21 to reduce crosstalk to the first output port.

Conventionally, in order to reduce an insertion loss on one of the output ports and reduce crosstalk on the other output port when a mirror is inserted and removed, the mirror is made, for example, sufficiently larger than the beam diameter of the light beam 40. Generally as shown in FIG. 1A, the mirror 30 is inserted to sufficiently intersect the light beam when inserted. Further, generally as shown in FIG. 1C, the mirror 30 is sufficiently moved away from the light beam when removed (for example, reference 1: Japanese Patent Application Laid-Open No. 2004-354458).

As described above, conventionally in order to reduce an insertion loss and crosstalk, it is recognized that the driving stroke of the mirror 30 has to have a length ST1 as shown in FIG. 1C. For this reason, the load of a mirror driving mechanism is increased.

SUMMARY OF THE INVENTION

In view of such circumstances, an object of the present invention is to provide an optical switch capable of reducing the driving stroke of a mirror as compared with the conventional art and having sufficient performance against an insertion loss and crosstalk.

In the present invention, by disposing a blocking portion in an area extending over a predetermined range from an end with respect to an insertion direction on a mirror surface of the mirror, the blocking portion can stay, when the mirror is removed, on a position where the blocking portion should be removed in the conventional art.

These and other objects, features and advantages of the present invention will become more apparent upon reading of the following detailed description along with the accompanied drawings.

BRIEF DESCRIPTION OF THE DRAWINGS

FIG. 1A is an explanatory drawing showing an operation performed when a mirror is disposed on an insertion position;

FIG. 1B is an explanatory drawing showing an operation performed when the mirror is disposed on an intermediate position;

FIG. 1C is an explanatory drawing showing an operation performed when the mirror is disposed on a removal position;

FIG. 5C is an explanatory drawing showing the maximum value of the length of the blocking portion;

FIG. 6A is an explanatory drawing showing an operation performed when a mirror is disposed on an insertion position;

FIG. 6B is an explanatory drawing showing an operation performed when the mirror is disposed on a removal position;

FIG. 7A is an explanatory drawing showing an operation performed when a mirror is disposed on an insertion position;

FIG. 7B is an explanatory drawing showing an operation performed when the mirror is disposed on a removal position;

FIGS. 8A and 8B are an explanatory drawing showing the configuration and operations of an optical switch according to Fourth Embodiment of the present invention;

FIG. 8A is an explanatory drawing showing an operation performed when a mirror is disposed on an insertion position; and FIG. 8B is an explanatory drawing showing an operation performed when the mirror is disposed on a removal position.

BEST MODE FOR CARRYING OUT THE INVENTION

First Embodiment

Figure 1A:
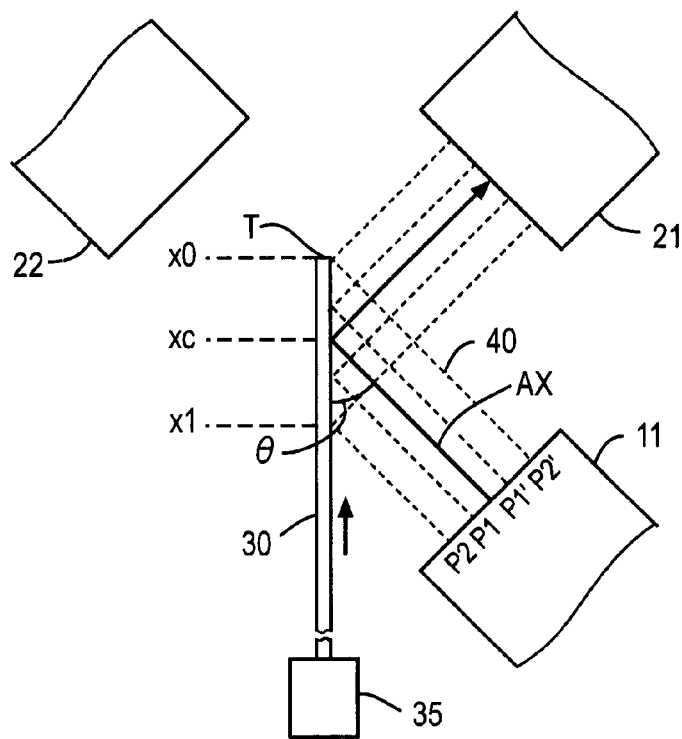
FIGS. 1A to 1C are explanatory drawings showing the operations of the conventional invention.

First, an insertion loss and crosstalk will be specifically described below. In the drawings discussed below, the same parts as those of FIG. 1 are indicated by the same reference numerals and symbols and the explanation thereof is omitted.

FIG. 1 is a plan view for explaining an optical switch of the conventional art invention and the principle of operation of the optical switch. The optical switch includes at least an input port 11 for emitting a light beam, first and second output ports 21, 22 for receiving the light beam, a reflector (in this example, a mirror 30 is used as a reflector) driven while being inserted from and removed in the optical path of the light beam from the input port 11, and driving means 35 for driving the mirror 30.

The light beam which is inputted from the outside is emitted from the other end of the input port 11. The second output port 22 is disposed in the traveling direction of the light beam emitted from the input port 11. The mirror 30 is inserted in and removed from the optical path of the light beam traveling from the input port 11 to the second output port 22. When the light beam emitted from the input port 11 is incident on the mirror 30, the mirror 30 reflects the received light. The first output port 21 is disposed in the traveling direction of the light beam reflected by the mirror 30.

As shown in FIG. 1A, the mirror 30 is inserted in the optical path until an end T of the mirror 30 reaches a position x0 in the optical path of the light beam emitted from the input port 11, so that the light beam emitted from the input port 11 is reflected by the mirror 30 and is coupled to the first output port 21.

Figure 1B:
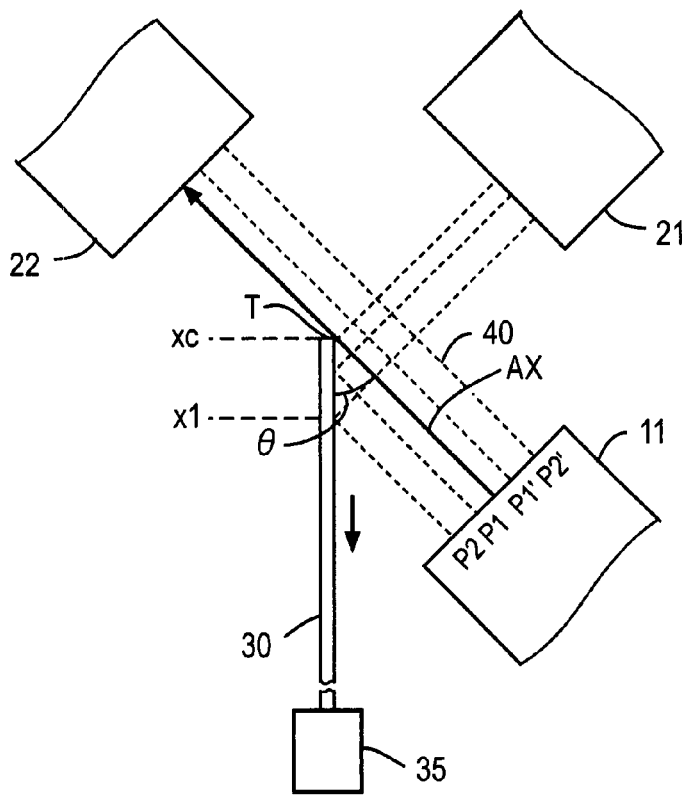
Figure 1C:
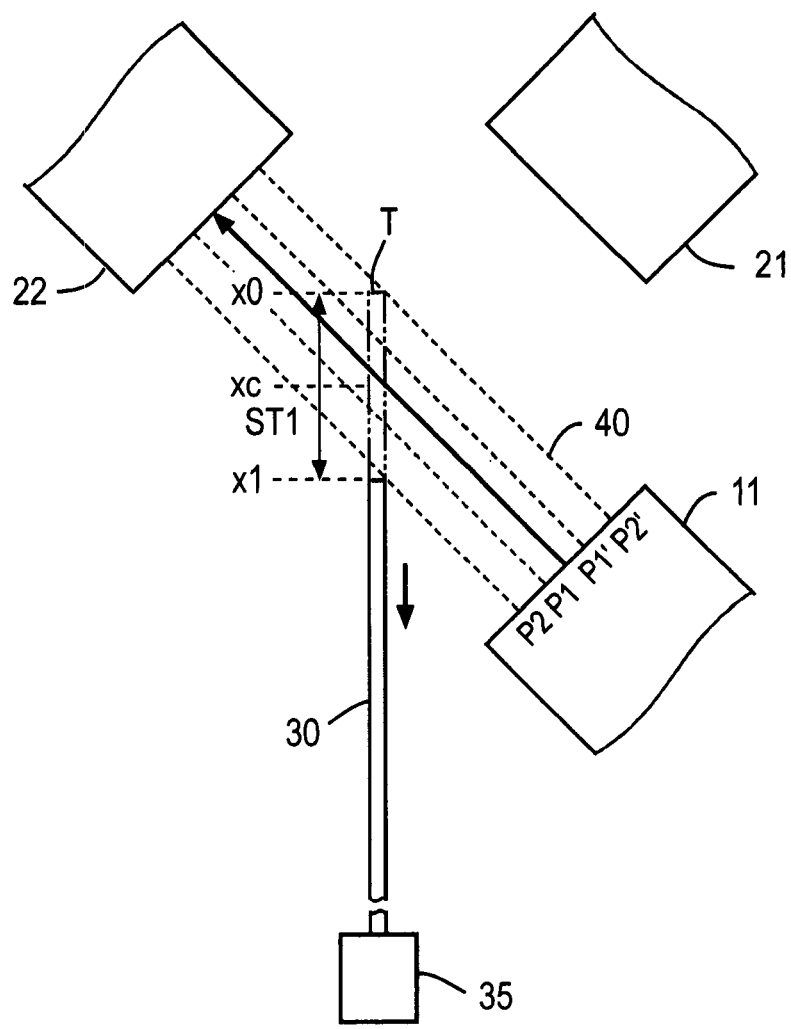

Further, as shown in FIG. 1C, the mirror 30 is removed from the optical path until the end T of the mirror 30 reaches a position x1 in the optical path of the light beam, so that the light beam emitted from the input port 11 is coupled to the second output port 22 disposed in the traveling direction of the light beam.

The input port 11 and the first and second output ports 21 and 22 are made of optical waveguide means such as, for example, an optical fiber or an optical waveguide. In this example, the driving means 35 linearly moves the mirror 30 in a reciprocating manner. The driving means 35 can be, for example, a comb-drive actuator (for example, see reference 2: Japanese Patent Application Laid-Open No. 2005-37885).

FIG. 1B illustrates an intermediate state between FIG. 1A and FIG. 1C. In FIG. 1B, the end T of the mirror 30 is placed on a position xc making contact with an optical axis AX of the light beam 40. In this case, a part of the light beam is reflected by the mirror 30 and is coupled to the first output port 21 and the other part of the light beam is coupled to the second output port 22 without being incident on the mirror 30.

Figure 2:
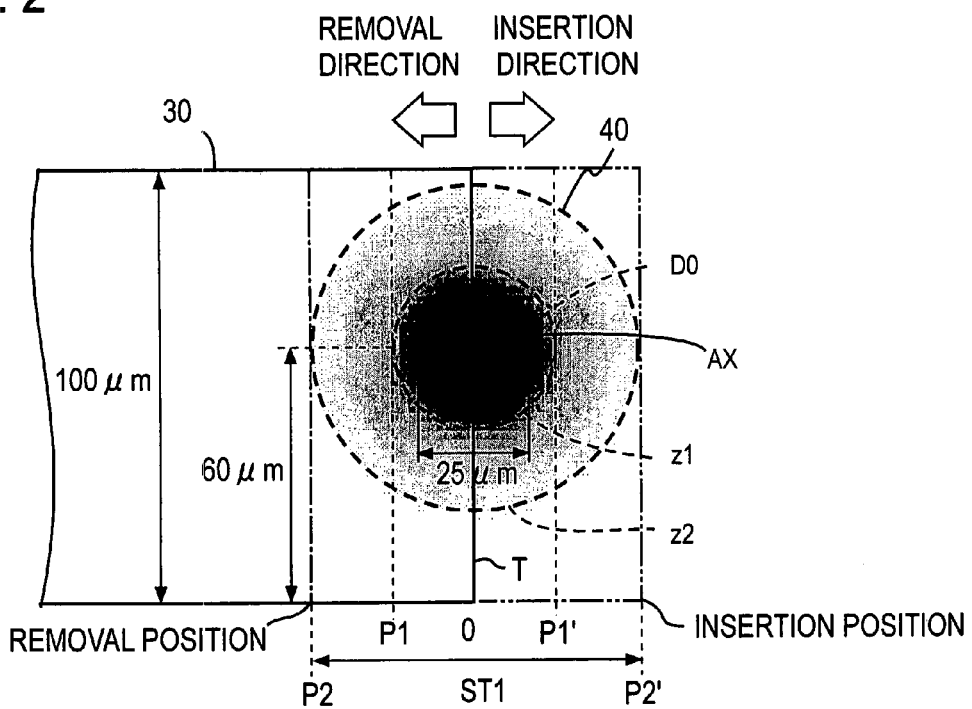
FIG. 2 is viewed from an input port and shows that a light beam is emitted from the input port to an output port and the mirror is inserted in and removed from the light beam.
Figure 3:
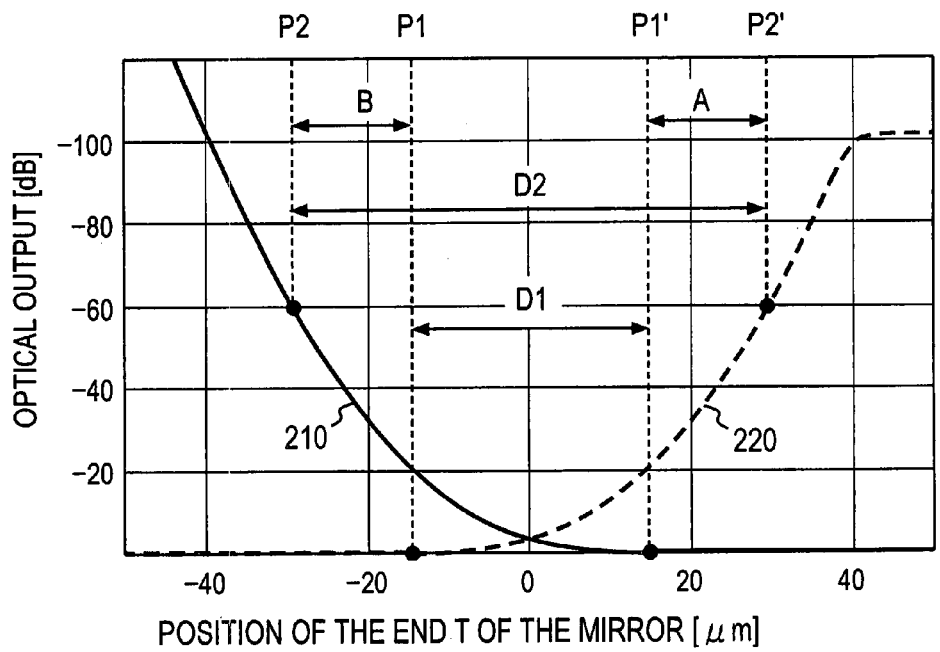
FIG. 3 is a graph showing the relationship between a mirror end position and the optical output of each output port.

FIG. 2 shows a state viewed from the input port 11 (from the position of the input port 11). In this state, the light beam 40 emitted from the input port 11 travels to the output port 22 perpendicularly to the plane of FIG. 2 and the mirror 30 is inserted in and removed from the light beam 40. FIG. 3 shows the relationship between the position of the end T of the mirror 30 (a position of a portion T serving as the end when the mirror is inserted in the optical path) and the optical outputs 210 and 220 of the output ports 21 and 22.

In FIG. 3, the optical outputs 210 and 220 of the output ports 21 and 22 are determined by calculation in the case where the light beam 40 having a beam diameter (a diameter having an electric field strength of $1/e^2$ of the center or a diameter having an optical amplitude of $1/e$ of a value on the optical axis) of 25 μm is emitted from a position at a height of 60 μm from the lower end of the mirror 30. The mirror 30 is shaped like a rectangular having a height of 100 μm and a predetermined length. The horizontal axis of FIG. 3 represents a position of the end T of the mirror. In FIG. 3, 0 indicates a position where the end T of the mirror 30 is in contact with the central axis AX of the light beam 40 as shown in FIG. 1B (a position indicated by a solid line in FIG. 3). The insertion direction from 0 has a positive value and the removal direction from 0 has a negative value.

The horizontal axis represents a distance in a perpendicular direction with respect to the central axis AX of the light beam 40, and thus an actual amount ST1 of movement of the mirror 30 in the insertion and removal directions ranges between the position x0 of FIG. 1A and the position x1 of FIG. 1C. When the optical axis AX of the light beam and the mirror 30 form an angle θ, it is necessary to multiply a distance on the horizontal axis (a distance between P2 and P2') by 1/sin θ. Although the angle θ is 45° in FIG. 3, the angle θ may be any angle other than 45°.

This holds true for a length ST1 of a driving stroke in FIG. 2, a length α of a blocking portion 31, and lengths ST2, ST2' ST2" and so on of the driving stroke in FIGS. 5A to 5C (will be described later). To be specific, for example, the actual length ST1 of the driving stroke of the mirror 30 in FIG. 2 is ST1 of FIG. 1C and it should be noted that the actual length ST1 is obtained by multiplying the length ST1 of the driving stroke in FIG. 2 by 1/sin θ.

In the following explanation, an insertion loss value having been generally accepted is set at 0.1 dB, an insertion loss value in the optical switch of the present invention is reduced to this value or less, a permissible crosstalk value is set at −60 dB, and a crosstalk value in the optical switch of the present invention is reduced to this value or less. In this case, when the insertion loss value has to be set at the predetermined value or less, the insertion/removal range of the mirror 30 is different from the insertion/removal range when the crosstalk value has to be set at the predetermined value or less.

In FIG. 3, P1' indicates a boundary position where reflected light to be incident on the first output port 21 has an insertion loss value of 0.1 dB or less when the mirror 30 is inserted in the optical path of the light beam 40. In other words, reflected light to be incident on the first output port 21 has an insertion loss value exceeding 0.1 dB unless the end T of the mirror 30 reaches the boundary position P1'. When the mirror 30 is inserted beyond P1', the insertion loss value is 0.1 dB or less.

P2' indicates a position where the crosstalk value on the second output port 22 is −60 dB when the mirror 30 is further inserted and the end T of the mirror 30 reaches P2'. In other words, the crosstalk value on the second output port 22 exceeds −60 dB unless the end T of the mirror 30 reaches the boundary position P2'. When the mirror 30 is inserted beyond P2', the crosstalk value is −60 dB or less.

As is evident from the mutual positional relationship between P1' and P2', when inserted, the mirror 30 has to be further inserted beyond the insertion position P1' determined for setting the insertion loss value on the first output port 21 at 0.1 dB or less, and the mirror 30 has to reach the insertion position P2' determined for setting the crosstalk value on the second output port 22 at −60 dB or less.

In FIG. 3, P1 indicates a position where light to be incident on the second output port 22 has an insertion loss value of 0.1 dB when the mirror 30 is removed from the insertion position and the end T of the mirror 30 reaches P1. In other words, light to be incident on the second output port 22 has an insertion loss value exceeding 0.1 dB unless the end T of the mirror 30 reaches the boundary position P1. When the mirror 30 is removed beyond P1, the insertion loss value is 0.1 dB or less.

P2 indicates a position where the crosstalk value on the first output port 21 is −60 dB when the mirror 30 is further removed and the end T of the mirror 30 reaches P2. In other words, the crosstalk value on the first output port 21 exceeds −60 dB unless the end T of the mirror 30 reaches the position P2. When the mirror 30 is removed beyond P2, the crosstalk value is −60 dB or less.

As is evident from the mutual positional relationship between P1 and P2, when removed, the mirror 30 has to be removed beyond the removal position P1 determined for setting the insertion loss value on the second output port 22 at 0.1 dB or less, and the mirror 30 has to be further removed to the removal position P2 determined for setting the crosstalk value on the first output port 21 at −60 dB or less.

As described above, in order to set the insertion loss values of the light beams received by the output ports 21 and 22 at the permissible value (0.1 dB) or less during the switching of optical paths, the mirror 30 has the minimum insertion/removal range between the positions P1 and P1' as shown in FIG. 3. A distance between the positions P1 and P1' serves as an insertion/removal range D1 necessary for obtaining a permissible insertion loss value. The insertion/removal range D1 necessary for obtaining the permissible insertion loss value is equal to a diameter D1 of an area z1 necessary for obtaining the permissible insertion loss value in FIG. 2 (will be described later).

In order to set the crosstalk values of the output ports 21 and 22 at the permissible value (−60 dB) or less, the mirror 30 has the minimum insertion/removal range between the positions P2 and P2' as shown in FIG. 3. A distance between the positions P2 and P2' serves as an insertion/removal range D2 necessary for obtaining a permissible crosstalk value. The insertion/removal range D2 necessary for obtaining the permissible crosstalk value is equal to a diameter D2 of a marginal area z2 to be blocked to obtain the permissible crosstalk value in FIG. 2 (will be described later).

Areas representing differences between the two insertion/removal ranges are denoted as areas A and B as shown in FIG. 3. It is generally considered that a distance of the area A (between the positions P1' and P2') and a distance of the area B (between the positions P1 and P2) are equal to each other.

Considering the area A, the following findings are obtained: only by stopping the end T of the mirror 30 on the position P2' during the insertion of the mirror and satisfying conditions for reducing crosstalk to the second output port 22, that is, light-shielding conditions on the second output port 22, it is possible to eliminate the need for a reflective surface on a portion covering the area A on a mirror surface 31a or even when a reflective surface is provided, it is possible to configure the blocking portion 31 not allowing reflected light to be incident on the first output port 21.

Considering the area B, the following findings are obtained: when removing the mirror, only by stopping the end T of the mirror in the area B such that a rear end q with respect to the insertion direction of the blocking portion 31 configured on the mirror 30 is in contact with the boundary P2 of the area B and only by satisfying conditions for reducing an insertion loss on the second output port 22, the blocking portion can also satisfy the conditions for reducing crosstalk to the first output port 21. In other words, the blocking portion stopped in the area B does not reflect a light beam or even when the blocking portion reflects a light beam, the blocking portion does not couple the light beam to the first output port 21, so that the conditions for reducing crosstalk to the first output port 21 are satisfied. As a result, it is possible to keep the end T of the mirror in the area B.

FIG. 2 corresponding to FIG. 3 shows the area z1 necessary for obtaining the permissible insertion loss value and the marginal area z2 necessary for obtaining the permissible crosstalk value in the light beam 40. These areas will be more specifically described below.

In order to set the insertion loss value of a light beam emitted to one of the output ports at the predetermined permissible insertion loss value or less or below the predetermined permissible insertion loss value, a light beam in the area z1 necessary for obtaining the permissible insertion loss value has to be emitted to the output port.

To be specific, when the mirror 30 is inserted in FIG. 2, the light beam 40 is reflected and incident on the first output port 21. At this moment, the insertion loss value of the optical output of the first output port 21 has to be equal to or lower than the permissible insertion loss value. Thus light of the area z1 necessary for obtaining the permissible insertion loss value has to be reflected and be incident on the first output port 21. The area z1 has the diameter D1 (distance between P1 and P2) larger than a beam diameter D0 of the light beam 40.

Further, when the mirror 30 is removed, the light beam 40 is not interrupted by the mirror 30 and is incident on the second output port 22. At this moment, the insertion loss value of the optical output of the second output port 22 has to be equal to or lower than the permissible insertion loss value. Thus light of the area z1 necessary for obtaining the permissible insertion loss value has to be transmitted and be incident on the second output port 22. The area z1 has the diameter D1 (distance between P1 and P2) larger than the beam diameter D0 of the light beam 40.

In order to set a crosstalk value on one of the output ports at the predetermined permissible crosstalk value or less or below the predetermined permissible crosstalk value, it is necessary to prevent a light beam in the marginal area z2 from being emitted to the output port.

To be specific, when the mirror 30 is inserted in FIG. 2, the light beam 40 is reflected and is incident on the first output port 21, so that the light beam 40 does not reach the second output port 22. At this moment, the crosstalk value of the optical output of the second output port 22 has to be equal to or lower than the permissible crosstalk value. Thus it is necessary to cause the mirror 30 to block light of the marginal area z2 to be blocked to obtain the permissible crosstalk value. The marginal area z2 is concentric with the beam area having the beam diameter D0 and has the diameter D2 (distance between P2 and P2') larger than the beam diameter D0.

When the mirror 30 is removed, the crosstalk value of the optical output of the first output port 21 has to be equal to or lower than the permissible crosstalk value. Thus light of the marginal area z2 to be blocked to obtain the permissible crosstalk value has to pass by the mirror 30 without being reflected by the mirror 30, the marginal area z2 having the diameter D2 larger than the beam diameter D0. In other words, such passage of light is also regarded as interruption on the first output port 21.

Moreover, the diameter D2 of the marginal area z2 to be blocked to obtain the permissible crosstalk value −60 dB is about 1.5 times or larger than the beam diameter D0. Thus the diameter D2 is larger than the diameter D1 of the area z1 necessary for obtaining the permissible insertion loss value.

The present invention is based on the foregoing findings and is characterized in that the blocking portion 31 is provided at a portion serving as the front end with respect to the insertion direction of the mirror 30. The blocking portion 31 blocks the coupling of the light beam from the input port 11 both to the second output port 22 by preventing its transmission and to the first output port 21 as well by preventing its reflection or, even when the light is reflected, by preventing the reflected light from being incident upon the first output port 21.

FIG. 4 shows an example of an optical switch according to First Embodiment of the present invention. In the optical switch, a mirror 30 has a pillar triangular in cross section or a ridged protrusion as a blocking portion 31. Parts corresponding to those of FIG. 1 are indicated by the same reference numerals. In FIG. 4 (also in FIG. 1), an area necessary for obtaining the permissible insertion loss value and a marginal area to be blocked to obtain the permissible crosstalk value are indicated by broken lines.

Figure 4A:
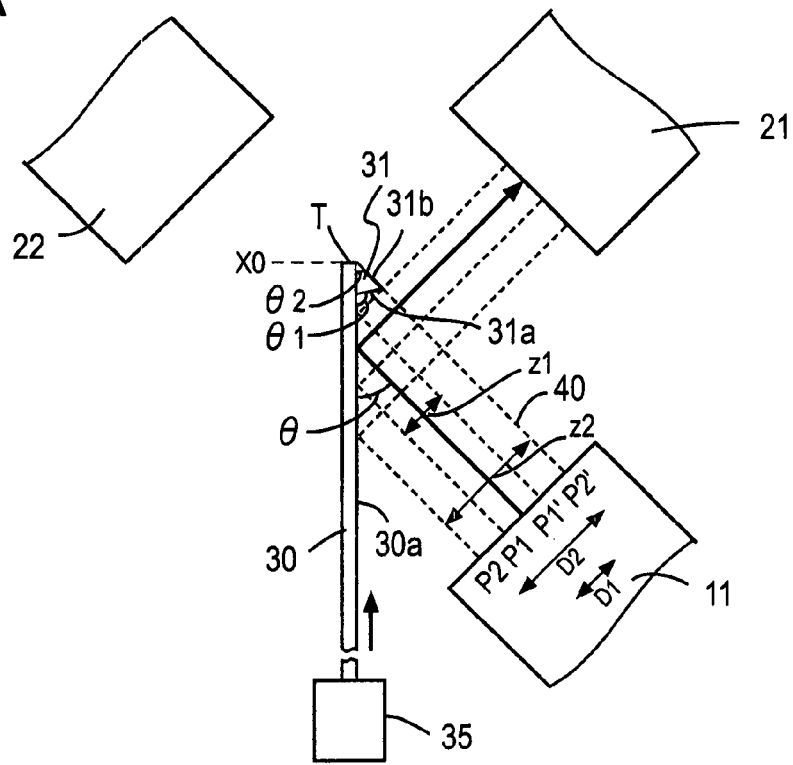
FIG. 4A is a view of an operation in a state in which a mirror is stopped on an insertion position in an optical switch according to First Embodiment of the present invention.
Figure 4B:
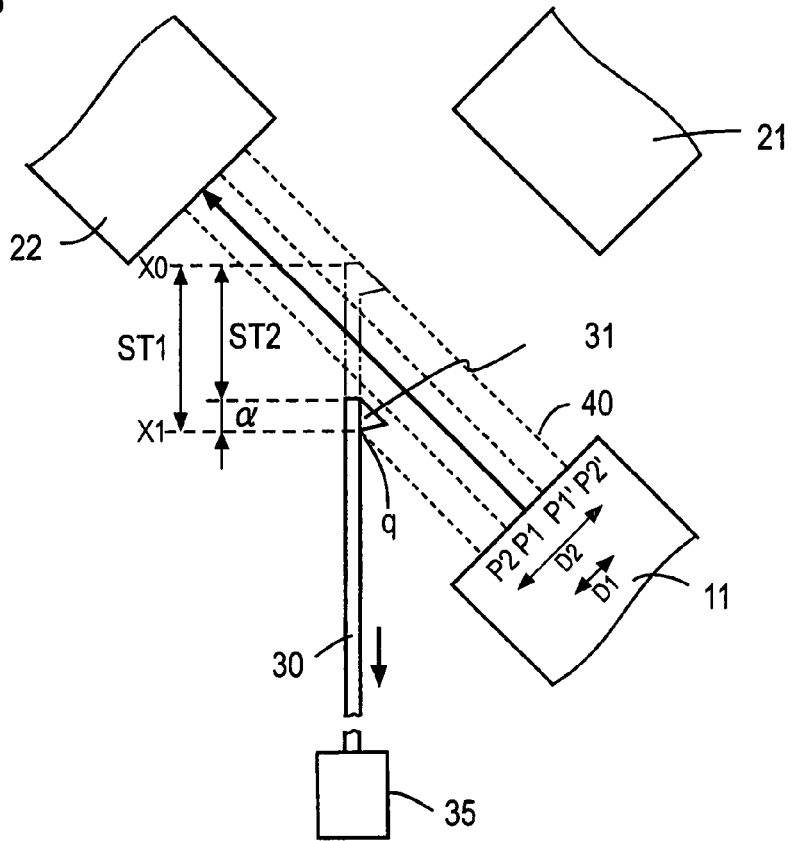
FIG. 4B is an explanatory drawing showing an operation performed when the mirror is disposed on a removal position.

The mirror 30 is shaped like a rectangle and has a mirror surface 30a. In this example, the blocking portion 31 is protruded from the mirror surface 30a of the mirror 30. The blocking portion 31 is shaped like a pillar which is triangular in cross section taken along a plane parallel to a plane (the plane of FIG. 4A) including the optical axes of the input port 11 and the first and second output ports 21 and 22 or a ridged protrusion. FIG. 4D shows an example of the blocking portion 31 shaped like a ridged protrusion. The mirror surface 30a of the mirror 30 is disposed perpendicularly to the plane and the mirror 30 is inserted in the direction of an arrow shown in FIG. 4A so as to diagonally intersect the optical axis of the light beam 40. One of the sides of the rectangular shape of the mirror 30 serves as the end T with respect to the insertion direction.

Figure 4C:
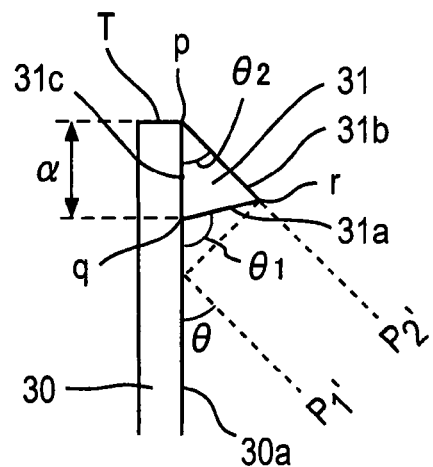
FIG. 4C is an enlarged view of a blocking portion.
Figure 4D:
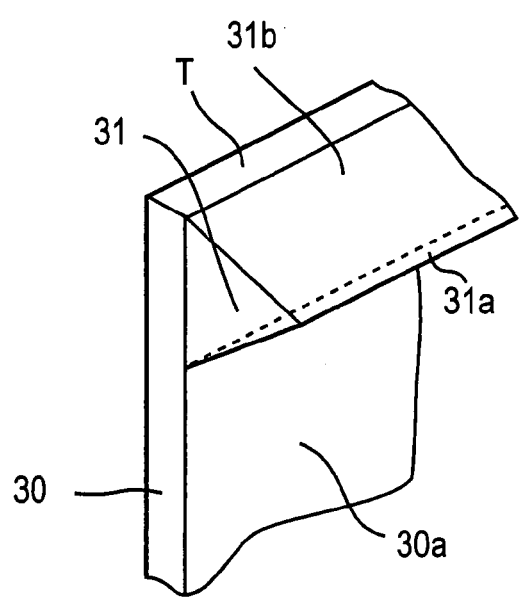
FIG. 4D is a perspective view of the blocking portion.

When the cross-sectional triangle of the protrusion making up the blocking portion 31 has corners represented as p, q and r as shown in FIG. 4C, the blocking portion 31 is integrally formed with the mirror 30 in such a manner that a protrusion surface 31c from p to q is integrally formed with an end area of the mirror 30 which is located from the front end T toward the rear end of the mirror 30 over a distance α. The blocking portion 31 shaped like a triangle in cross section, that is, the blocking portion 31 shaped like a triangular pole or a ridged protrusion can be easily formed from a monocrystalline silicon substrate by an etching technique.

When the optical axis of the light beam 40 incident on the mirror 30 and the mirror 30 form an angle θ, one side (between the corners p and q) of the blocking portion 31 has a length α on the mirror 30 with respect to the insertion/removal direction of the mirror 30, and the maximum value αmax of the length α is obtained by multiplying a distance between the positions P1 P2 (or between P2' and P1') by 1/sin θ. In this example, the blocking portion 31 on the mirror 30 has the length α with respect to the insertion/removal direction of the mirror 30 and the length α is equal to or smaller than the length αmax obtained by multiplying the distance between the points P1 and P2 (area B) by 1/sin θ. In other words, a difference between one side of the diameter D1 of the area z1 necessary for obtaining the permissible insertion loss value and one side of the diameter D2 of the marginal area z2 to be blocked to obtain the permissible crosstalk value is the length α which is equal to or smaller than the length αmax with respect to the insertion direction or the removal direction of the mirror 30, the areas z1 and z2 being indicated by broken lines in FIG. 4. In other words, the length of the blocking portion 31 with respect to the insertion direction of the mirror 30 is the length α which is equal to or smaller than the value αmax. The value αmax is obtained as follows: a difference between the diameter D2 of the marginal area z2 to be blocked to obtain the permissible crosstalk value and the diameter D1 of the area z1 for obtaining the permissible insertion loss value is divided by 2 and the obtained value is multiplied by 1/sin θ where θ represents an angle formed by the optical axis of a light beam incident on the mirror 30 and the mirror 30.

A surface 31a of the protrusion making up the blocking portion 31 triangular in cross section forms one side (between q and r) protruding from the mirror surface 30a. The surface 31a is not perpendicular to the optical axis of the light beam from the input port 11 and is inclined so as to reflect the light beam 40 from the input port 11, in the plane of incidence, in the opposite direction from the direction of reflection on the mirror surface 30a. In FIG. 4A, θ1 represents an angle of inclination with respect to the mirror surface 30a and the angle θ1 is not larger than θ+90°. In other words, the surface 31a is formed such that the light beam 40 reflected by the surface 31a is not emitted to the output port 21. In this example, the surface 31a is formed with the angle θ1 of inclination. The angle θ1 is selected such that the light beam reflected by the surface 31a is emitted in a direction between the mirror 30 and the input port 11 but does not return to the input port 11.

Further, a surface 31b making up the other side (between p and r) protruding from the mirror surface 30a of the blocking portion 31 shaped like a triangular protrusion forms an angle θ2 of inclination with respect to the mirror surface 30a. The angle θ2 is preferably set at θ or larger to prevent the light beam 40 from the input port 11 from being incident on the surface 31b. Even when the angle θ2 of inclination is set slightly smaller than θ and the light beam is reflected by the surface 31b, the angle θ2 is acceptable unless the reflected light is incident on the first output port. In this example, θ2 is equal to θ, so that the surface 31b is parallel to the optical axis of the light beam 40 from the input port 11.

The protrusion surfaces 31a and 31b of the blocking portion 31 are inclined thus, so that even when the surfaces 31a and 31b are the same reflective surfaces as the mirror surface 30a, it is possible to prevent the light beam reflected by the blocking portion 31 from being coupled to the first output port 21 and prevent the light beam reflected by the blocking portion 31 from being coupled to the input port 11 as returned light.

The mirror 30 having the above blocking portion 31 on the end area of the mirror 30 is inserted in the optical path of the light beam 40 from the input port 11, and the end T with respect to the insertion direction of the mirror 30 is stopped on a position shown in FIG. 4A. On the insertion position of FIG. 4A, the end T of the mirror 30 or the protrusion surface 31b of the blocking portion 31 are in contact with the boundary P2' of the marginal area z2 to be blocked to obtain the permissible crosstalk value.

Figure 5A:
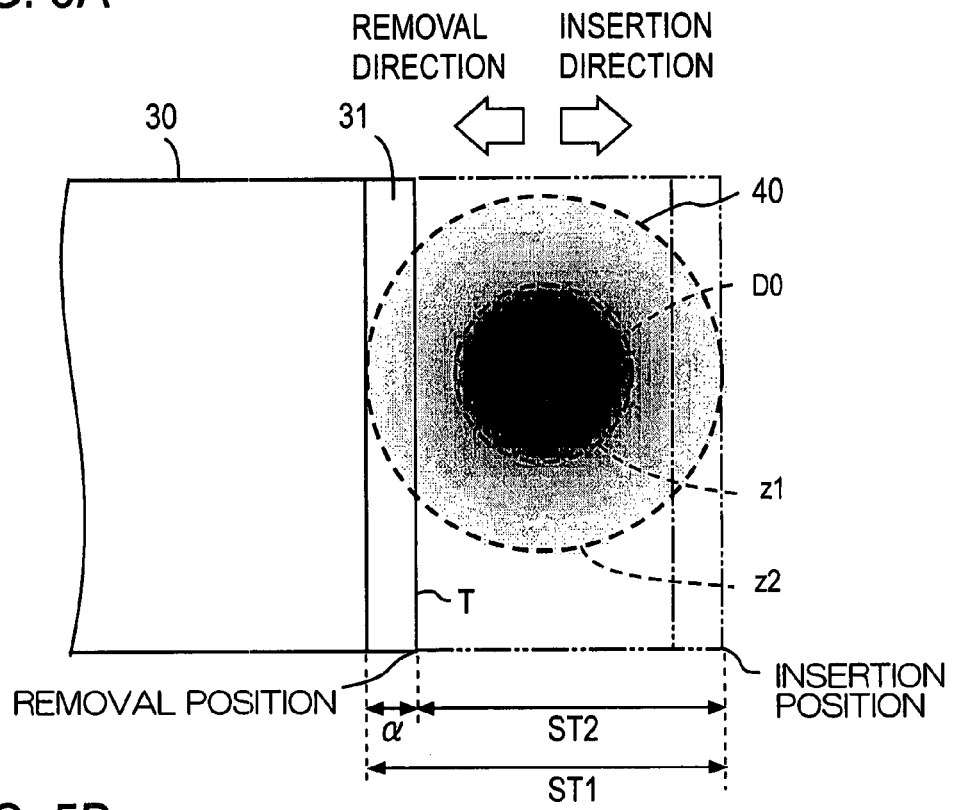
FIG. 5A is an explanatory drawing showing the removal position and a length ST2 of a driving stroke in the optical switch of First Embodiment.

When the mirror 30 is inserted and stopped on the position of FIG. 4A, the mirror is disposed on a position indicated by chain double-dashed lines in FIG. 5A. As is evident from FIG. 5A, the area z1 for obtaining the permissible insertion loss value is not covered with the blocking portion 31. Of the light beam 40 emitted from the input port 11, light in the area z1 necessary for obtaining the permissible insertion loss value is entirely incident on the first output port 21. As a result, the insertion loss of the first output port 21 can be set at the predetermined value (0.1 dB) or less.

FIG. 5A shows that the light beam 40 emitted from the input port 11 travels perpendicularly to the plane of FIG. 5A and is incident on the output port 22 and the mirror 30 is inserted in and removed from the light beam 40. FIG. 5A is viewed from the input port 11. The insertion position of the mirror 30 is indicated by the chain double-dashed lines in FIG. 5A and corresponds to the position of the mirror 30 in FIG. 4A.

By inserting the mirror 30 to the position shown in FIG. 4A, as indicated by the chain double-dashed lines of FIG. 5A, the blocking portion 31 and the mirror surface 30a cover the marginal area z2 (an area between P1' and P2') to be blocked to obtain the permissible crosstalk value of the second output port 22. As a result, it is possible to set the crosstalk value on the second output port 22 at the predetermined value (−60 dB) or less.

On the other hand, when the mirror 30 is removed from the optical path of the light beam 40 and the light beam 40 from the input port 11 is coupled to the second output port 22, the mirror 30 is stopped on a position shown in FIG. 4B. On the position of FIG. 4B, the rear end q with respect to the insertion direction of the blocking portion 31 is in contact with the boundary P2 on the removal side of the marginal area z2 to be blocked to obtain the permissible crosstalk value. In other words, when the mirror 30 is removed to this position, the overall blocking portion 31 remains in the marginal area z2 to be blocked to obtain the permissible crosstalk value.

When the mirror is stopped on the position of FIG. 4B, the mirror is disposed on a position indicated by solid lines in FIG. 5A. As is evident from FIG. 5A, the area z1 necessary for obtaining the permissible loss value is not covered with the blocking portion 31. Of the light beam 40 emitted from the input port 11, light in the area z1 necessary for obtaining the permissible loss value is entirely incident on the second output port 22. As a result, it is possible to set the insertion loss value on the second output port 22 at the predetermined value (0.1 dB) or less.

Further, the mirror 30 is removed to the position of FIG. 4B, so that the end of the mirror 30 is disposed in the marginal area z2 (an area between P1 and P2) to be blocked to obtain the permissible crosstalk value of the first output port 21. In the marginal area z2 to be blocked, the mirror 30 is covered with the blocking portion 31. Of the light beam 40 emitted from the input port 11, light in the marginal area z2 to be blocked to obtain the permissible crosstalk value is not incident on the first output port 21. As a result, it is possible to set the crosstalk value on the first output port 21 at the permissible value (−60 dB) or less.

In other words, when the mirror is inserted in the optical path, the blocking portion 31 reduces crosstalk by sufficiently shielding the second output port 22 from the light of the area to be blocked. When the mirror 30 is removed, the blocking portion 31 reduces crosstalk by preventing the light beam from being reflected by and coupled to the first output port 21. Thus when the mirror is removed, the mirror is only removed to the position shown in FIG. 4B and it is not necessary to remove the mirror from the optical path as sufficiently as the mirror 30 shown in, FIG. 1C. The mirror 30 of FIG. 1C does not include the blocking portion 31.

Thus in this example, the driving stroke of the mirror 30 can be reduced from the conventional length ST1 (see FIG. 1C) to ST2.

Figure 5B:
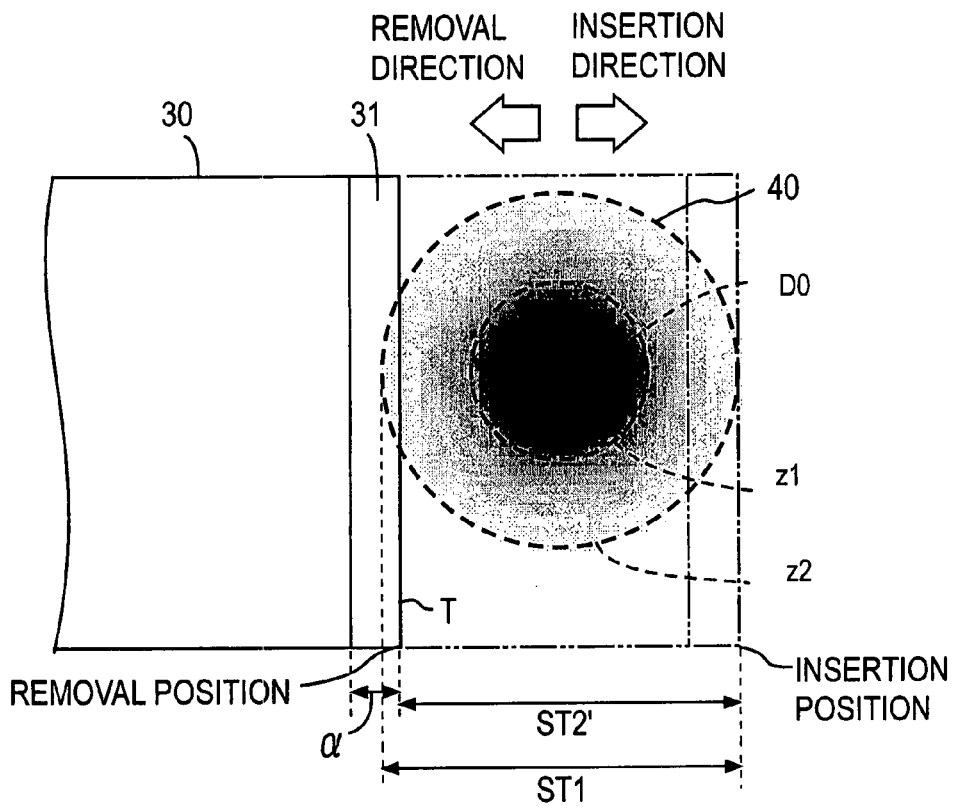
FIG. 5B is an explanatory drawing showing a length ST2' of the driving stroke.

Moreover, the removal position may be a position where the blocking portion 31 partially remains, as shown in FIG. 5B, in the marginal area z2 to be blocked to obtain the permissible crosstalk value. In this case, the length of the driving stroke is ST2' which is longer than the length ST2 of the driving stroke when the mirror is removed to the positions shown in FIGS. 4B and 5A. However, ST2' is still shorter than the lengths ST1 of the driving stroke of the mirror not including the blocking portion 31. For this reason, even when the mirror is removed to the position where the blocking portion 31 partially remains in the marginal area z2 to be blocked to obtain the permissible crosstalk value, the effect of the present invention can be obtained.

As shown in FIG. 5C, when the length $\alpha$ of the blocking portion 31 with respect to the insertion direction of the mirror 30 is $\alpha$max, a distance obtained by multiplying a distance of the area B (distance between P1 and P2) by $1/\sin\theta$ can maximize the effect of reducing the driving stroke of the mirror 30 according to the present invention. In this case, the length of the driving stroke is ST2".

A reduction in the driving stroke of the mirror 30 contributes to a reduction in the load of a driving mechanism. Particularly when the optical switch is fabricated by MEMS (Micro Electro Mechanical Systems) and a comb-drive electrostatic actuator is used as a driving mechanism, the driving voltage can be reduced.

Second Embodiment

Figure 6A:
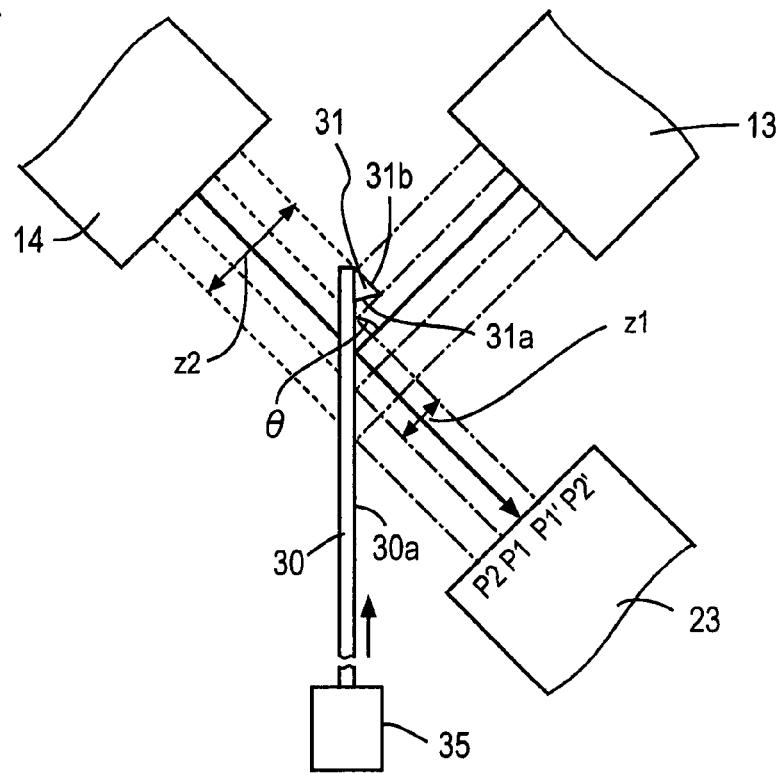
FIGS. 6A and 6B are explanatory drawings showing the configuration and operations of an optical switch according to Second Embodiment of the present invention.

Referring to FIG. 6, an optical switch according to Second Embodiment of the present invention will be described below. The optical switch of FIG. 6 is different from that of First Embodiment in that light beams are emitted from two input ports 13 and 14 and one of the light beams is incident on an output port 23. Other points are similar to those of the optical switch of First Embodiment.

In First Embodiment, a light beam is inputted from the outside to the input port 11 and is emitted and the light beam is incident on the first and second output ports 21 and 22. In Second Embodiment, it may be considered that the input port 11 is used as the output port 23 and the first and second output ports 21 and 22 are used as the first and second input ports 13 and 14.

In the case where the optical switch of First Embodiment shown in FIG. 4 is configured as an optical switch having a different function for a different use as shown in FIG. 6, a protrusion surface 31b of a blocking portion 31 is configured as a non-reflection surface.

A mirror 30 is inserted in an intersecting area of light beams emitted from the first input port 13 and the second input port 14. When the mirror 30 is disposed on an insertion position shown in FIG. 6A, a first light beam emitted from the first input port 13 is reflected by the mirror 30 and is coupled to the output port 23. Also on the insertion position of this example, as in the above optical switch, the blocking portion 31 and the mirror 30 cover a marginal area z2 to be blocked to obtain a permissible crosstalk value for a second light beam emitted from the second input port 14.

Figure 6B:
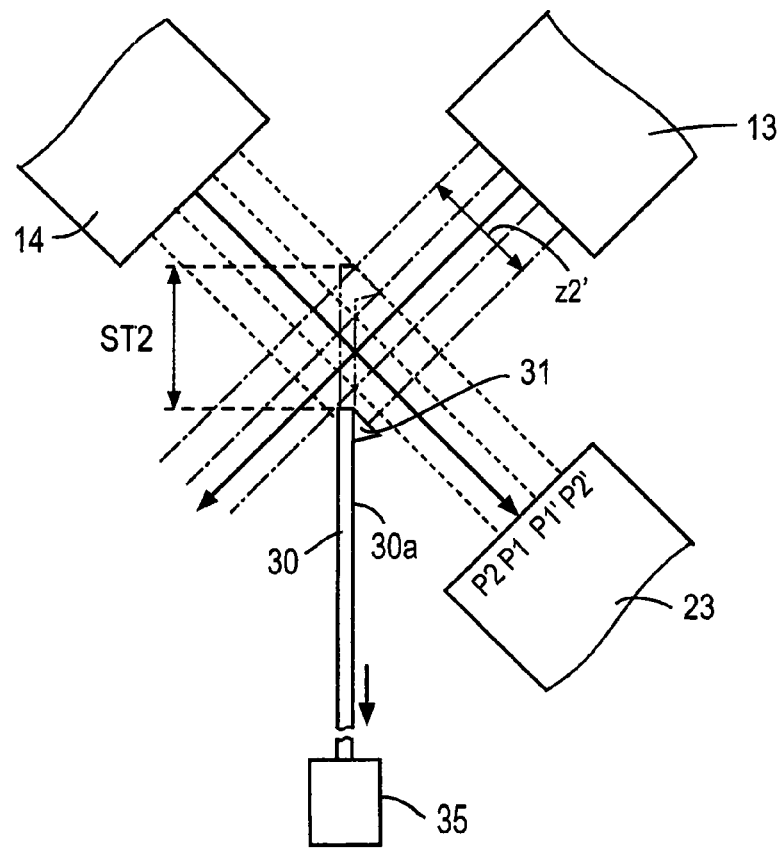

When the mirror 30 is disposed on a removal position shown in FIG. 6B, the light beam emitted from the second input port 14 travels straight as it is and is coupled to the output port 23. Also on the removal position of this example, as in the above optical switch, the blocking portion 31 partially or entirely remains in a marginal area z2' to be blocked to obtain a permissible crosstalk value for the first light beam emitted from the first input port. In this example, a surface 31b of the blocking portion 31 is made of a light absorption material (will be described later). Thus even when the mirror 30 is disposed on the removal position and the blocking portion 31 remains in the marginal area z2' to be blocked to obtain the permissible crosstalk value, the light beam which is outputted from the first input port 13 and is incident on the surface 31b is not coupled to the output port 23.

As described above, even when the input direction and output direction of the light beam are reversed, the mirror can be removed to the position where the blocking portion 31 partially or entirely remains in the marginal area z2' to be blocked to obtain the permissible crosstalk value for the first light beam. With this configuration, the driving stroke can be a length ST2 which is shorter than the lengths ST1 of the driving stroke of the mirror not including the blocking portion 31.

Third Embodiment

Figure 7A:
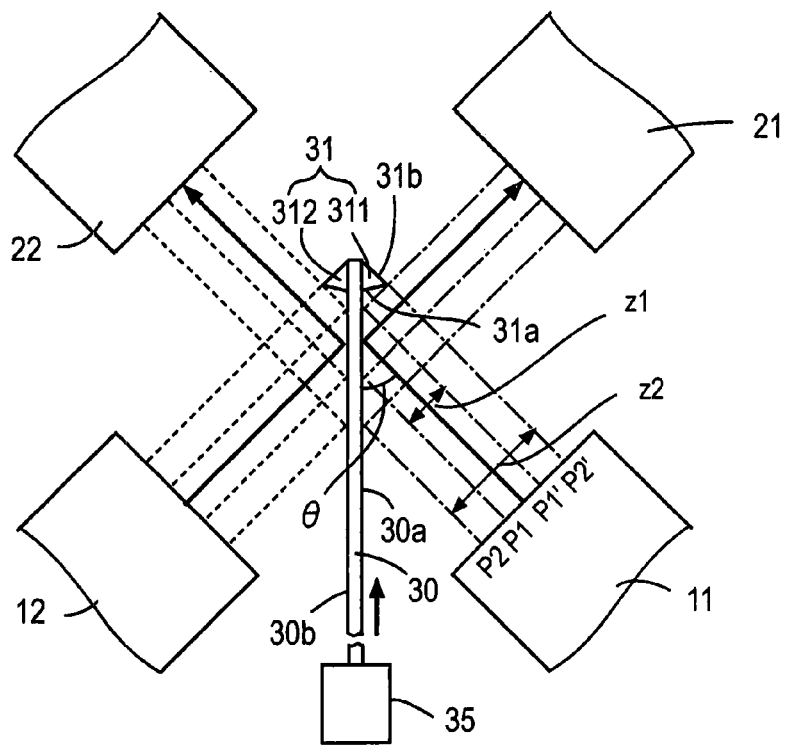
FIGS. 7A and 7B are explanatory drawings showing the configuration and operations of an optical switch according to Third Embodiment of the present invention.

Referring to FIG. 7, Third Embodiment will be described below. An optical switch shown in FIG. 7 is different from the above optical switches in that light beams emitted from two input ports 11 and 12 are respectively incident on one of output ports 21 and 22 and a blocking portion 31 is provided at both sides of an end of a mirror 30 with respect to an insertion direction. The blocking portion 31 is made up of first and second blocking means 311 and 312. Other points are similar to those of the optical switch of First Embodiment.

The mirror 30 is inserted in an intersecting area of light beams emitted from the input port 11 and the input port 12. When the mirror 30 is disposed on an insertion position shown in FIG. 7A, a first light beam emitted from the input port 11 is reflected by the mirror 30 and is coupled to the output port 21, and a second light beam emitted from the input port 12 is reflected by the mirror 30 and is coupled to the output port 22. Also on the insertion position of this example, as in the above optical switch, the mirror 30 and the blocking means 311 cover a marginal area z2 to be blocked to obtain a permissible crosstalk value for the first light beam and the mirror 30 and the blocking means 312 cover a marginal area z2' to be blocked to obtain a permissible crosstalk value for the second light beam.

Figure 7B:
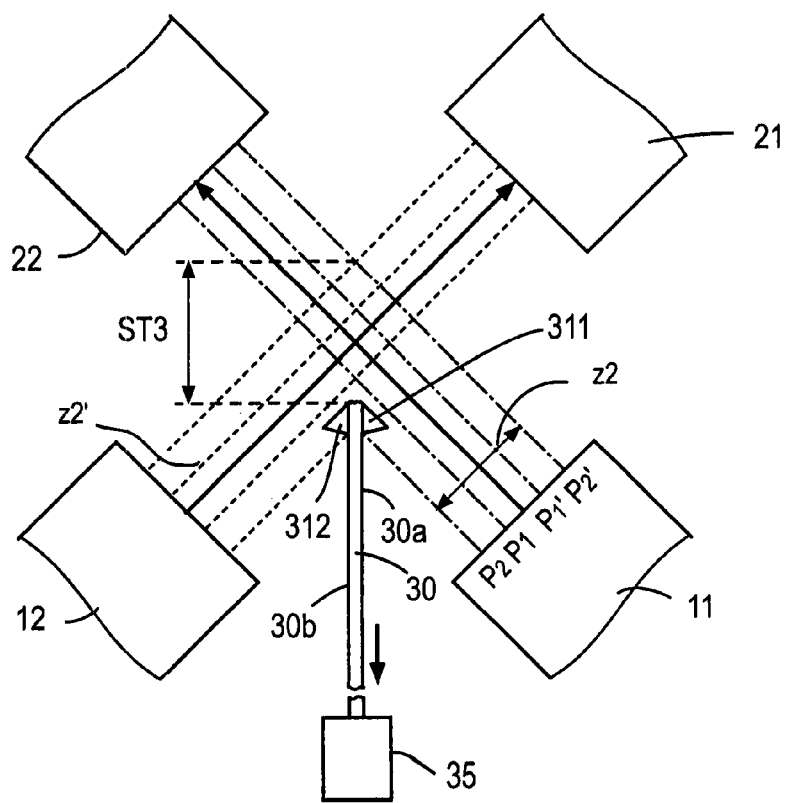

When the mirror 30 is disposed on a removal position shown in FIG. 7B, the first light beam emitted from the input port 11 travels straight as it is and is coupled to the output port 22 and the second light beam emitted from the input port 12 also travels straight as it is and is coupled to the output port 21. Also on the removal position of this example, as in the above optical switch, at least a part of the blocking means 311 remains in the marginal area z2 to be blocked to obtain the permissible crosstalk value for the first light beam and at least a part of the blocking means 312 remains in the marginal area z2' to be blocked to obtain the permissible crosstalk value for the second light beam.

As described above, even when the two input ports are provided, the blocking means 311 and 312 are provided at both sides of the end of the mirror 30 with respect to the insertion direction of the mirror 30 and thus the length of the driving stroke can be ST2 which is shorter than the lengths ST1 of the driving stroke of the mirror not including the blocking means 311 and 312.

Fourth Embodiment

Referring to FIG. 8, Fourth Embodiment will be described below. In this example, an input port 11 and first and second output ports 21 and 22 have parallel optical axes as shown in FIG. 8. The first output port 21, the input port 11, and the second output port 22 are arranged in this order. Three fixed mirrors 51, 52 and 53 are further provided in addition to a mirror 30 which is driven while being inserted in and removed from an optical path by driving means 35. The fixed mirror 51 is disposed in the traveling direction of a light beam emitted from the input port 11 and reflected by the mirror 30, the fixed mirror 52 is disposed in the traveling direction of the light beam emitted from the input port 11, and the fixed mirror 53 is disposed in the traveling direction of the light beam emitted from the input port 11 and reflected by the fixed mirror 52.

In the state of FIG. 8A showing the mirror 30 inserted in the optical path of the light beam from the input port 11, the light beam is reflected by the mirror 30, is reflected by the fixed mirror 51, and is coupled to the first output port 21.

On the other hand, in the state of FIG. 8B showing the mirror 30 removed from a switching position in the optical path of the light beam from the input port 11, the light beam passes through a position where the mirror 30 has been disposed as shown in FIG. 8A, and then the light beam is reflected by the fixed mirror 52, is reflected by the fixed mirror 53, and is coupled to the second output port 22.

In FIG. 8, an area necessary for obtaining a permissible insertion loss value and an area to be blocked to obtain a permissible crosstalk value are indicated by broken lines as in FIGS. 5, 7 and 8. On an end of the mirror 30 with respect to an insertion direction, a blocking portion 31' is provided. When the mirror is inserted (FIG. 8A), the blocking portion 31' prevents an incident light beam from being reflected by the fixed mirrors 52 and 53 and coupled to the output port 22. When the mirror is removed (FIG. 8B), the blocking portion 31' prevents an incident light beam from being reflected by the fixed mirror 51 and coupled to the output port 21.

Also in this example, when the mirror 30 is inserted in an optical path to reflect a light beam and couples the light beam to the first output port 21, an insertion loss on the first output port 21 and crosstalk on the second output port 22 can be made acceptable by disposing the mirror 30 on the insertion position of FIG. 8A. Further, when the mirror 30 is removed to the position of FIG. 8B, the insertion loss on the second output port 22 and the crosstalk on the first output port 21 can be made acceptable. Thus as in the example of FIG. 4, it is possible to reduce the length of the driving stroke of the mirror 30 to ST2 which is shorter than that of the mirror 30 not having the blocking portion 31'.

The blocking portion 31' is triangular in cross section as the blocking portion 31 of FIG. 4. In this example, a surface 31a making up one side protruding from a mirror surface 30a is parallel to a mirror surface 52a of the fixed mirror 52 and a surface 31b making up the other side protruding from the mirror surface 30a is parallel to the optical axis of the light beam from the input port 11. Further, in this example, the surface 31a is disposed on the end of the mirror 30 and the surfaces 31a and 31b are defined in an opposite way from the blocking portion 31 of FIG. 4.

The surfaces 31a and 31b of the blocking portion 31' are oriented as described above, so that the same function as the surfaces 31a and 31b of the blocking portion 31 in FIG. 4 can be obtained. Additionally, when the blocking portion 31' is integrally formed with the mirror 30 and the surfaces 31a and 31b are formed as reflective surfaces, as described above, the surface 31a is made parallel to the mirror surface 52a of the fixed mirror 52 in this example, so that light reflected by the surface 31a is coupled to the second output port 22 as indicated by a chain double-dashed line in FIG. 8B. In other words, when the mirror 30 is removed from the optical path, the blocking portion 31' contributes not only to suppression of crosstalk to the first output port 21 but also to reflection of the light beam to the second output port 22.

Instead of the fixed mirror 51 and the output port 21, an output port 21' may be provided in the traveling direction of the light beam reflected by the mirror 30. In this case, when the mirror 30 is inserted as shown in FIG. 8A, the light beam emitted from the input port 11 is coupled to the output port 21'. Further, instead of the fixed mirrors 52 and 53 and the output port 22, an output port 22' may be provided in the traveling direction of the light beam reflected by the fixed mirror 52. In this case, when the mirror 30 is removed as shown in FIG. 8B, the light beam emitted from the input port 11 is coupled to the output port 22'.

As described above, in the optical path of the light beam emitted from the input port 11 to the output ports 21 and 22, a given number of mirrors may be inserted, a light beam may be reflected by the inserted mirrors, and finally the light beam may be emitted to the output ports 21 and 22. This configuration is also applicable to the optical switches of FIGS. 4,6 and 7.

The above explanation illustrated the optical switches for linearly driving the mirror 30 in a reciprocating manner and for switching amounts of light in binary, that is, light and dark. However, the present invention is not limited to this kind of optical switch.

For example, instead of linearly driving the mirror 30, the mirror 30 may be inserted in and removed from an optical path by rotation. Further, even when the amounts of light of the two output ports 21 and 22 are not switched in binary, the present invention is applicable and the effect of the invention can be obtained as long as the optical switch requires at least a dark state of the first output port 21.

When the optical switch is fabricated by MEMS, the blocking portion 31 (31') can be easily formed by integrally forming the blocking portion 31 (31') with the mirror 30 as a deformed area of the mirror 30 as in the foregoing embodiments. In this case, a reflective film made of, for example, Au is formed on a surface of the mirror 30 to have an excellent mirror surface, and accordingly a similar reflective film is formed on a surface of the blocking portion 31 (31') to have a reflective surface. These surfaces are shaped and oriented as described in the foregoing embodiments, so that a predetermined function can be obtained.

When the optical switch is fabricated by MEMS using, for example, SOI (Silicon On insulator) substrate which comprises a single crystal silicon substrate, an insulator layer disposed on the substrate and a single crystal silicon layer on the insulator layer. In this case, the blocking portion 31(31') can be formed in any shape integrally with the mirror 30 by applying DRIE (Deep Reactive Ion Etching) perpendicularly to the single crystal silicon layer to thereby obtain an optical switch wherein the directions of the optical axis of the light beam 40 and the insertion/removal direction of mirror 30 are provided in parallel to the surface of the substrate. Then, crystal anisotropic wet etching is applied for a short time to the single crystal silicon layer so that the mirror surface 30a which is formed in parallel to a (100) plane of the single crystal silicon layer is smoothed, while the surfaces 31a, 31b of the blocking portion 31(31') other than the mirror surface 30a are not smoothed since they are not formed to be in parallel to the (100) plane. (for example, reference 3: Japanese Patent Application Laid-Open No. 2005-107, US 2005/0069246 A1). In this case, it does not matter because it is no necessary of the surfaces of the blocking portion 31(31') to be smooth.

Figure 9A:
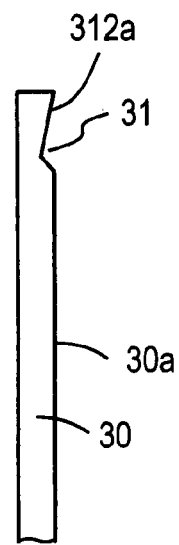
FIGS. 9A to 9C illustrate other shapes of the blocking portion.

The blocking portion 31 does not always have to be triangular in cross section. The blocking portion 31 may have any shape as long as the blocking portion 31 can prevent incident light from being coupled to the output port 21 and the output port 22 (desirably also to the input port 11). For example, as shown in FIG. 9A, the blocking portion 31 may be formed into a recess on the mirror surface 30a.

Figure 9B:
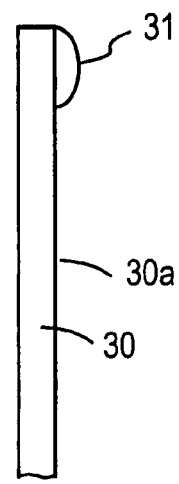
Figure 9C:
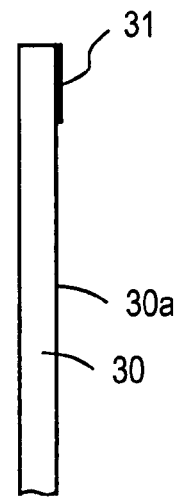

On the other hand, for example, when the optical switch is not fabricated by MEMS, the blocking portion is preferably made of a light absorption material. In this case, the orientation of the surfaces making up the blocking portion is not particularly limited. Further, the shape of the blocking portion is not particularly limited. For example, as shown in FIG. 9B, the blocking portion can be shaped like an arc in cross section parallel to a plane including the optical axes of the input port 11 and the output ports 21 and 22. Moreover, as shown in FIG. 9C, the blocking portion may be formed by application or the like of a light absorption material on the end of the mirror 30. The light absorption material includes, for example, a black resin material containing dispersed carbon. Alternatively, an acrylic lacquer or a coating of a synthetic resin such as vinyl acetate may be applied as a light absorption material and the like.

In Fourth Embodiment of FIG. 8, instead of the two blocking means 311 and 312, a single blocking portion formed by combining the two blocking means 311 and 312 may be provided at the end of the mirror 30.

The configuration of the present invention can be changed as appropriate without departing from the spirit of the present invention.

EFFECTS OF THE INVENTION

According to the present invention, when a mirror is removed from an optical path, a removal position of the removed mirror can be close to a light beam as compared with the conventional art, and the length of the driving stroke of the mirror can be shorter than that of a mirror not having the blocking portion. Further, in this state, it is possible to achieve sufficient performance regarding an insertion loss and crosstalk.

What is claimed is:

1. An optical switch, comprising:
   an input port for emitting a light beam;
   a reflector for reflecting the light beam incident thereon, the reflector being movable to be inserted in an optical pat of the light beam to stop on a predetermined insertion position, and to be removed from the insertion position to stop on a predetermined removal position;
   driving means for moving the reflector between the insertion position and the removal position;
   a first output port for receiving the light beam reflected by the reflector; and
   a second output port for receiving the light beam that is untouched by the reflector; wherein
   a blocking portion is provided at an end area of the reflector with respect to an insertion direction, the blocking portion preventing the light beam, when the light beam is incident thereon, from coupling to both the first and second output ports,
   the optical path of the light beam has a beam area having a predetermined beam diameter and a marginal area to be blocked to obtain a permissible crosstalk value, the marginal area being concentric with the beam area, and having a predetermined diameter larger than the beam diameter,
   on the insertion position, the reflector and the blocking portion cover the marginal area, and
   on the removal position, at least a part of the blocking portion remains in the marginal area.

2. An optical switch, comprising:
   a first input port for emitting a first tight beam;
   a second input port for emitting a second light beam intersecting the first light beam;

a reflector which is movable to be inserted in an intersecting area of an optical path of the first light beam and an optical path of the second light beam to stop on a predetermined insertion position, and to be removed from the insertion position to stop on a predetermined removal position, the reflector blocking the second light beam and reflecting the first tight beam when the reflector is disposed on the insertion position;

driving means for moving the reflector between the insertion position and the removal position; and an output port for receiving the first light beam reflected by the reflector and receiving the second tight beam that is untouched by the reflector; wherein a blocking portion is provided at an end area of the reflector with respect to an insertion direction, the blocking portion preventing the first light beam, when the first light beam is incident thereon, from coupling to the output port, each optical path of the first and second light beams has a beam area having a predetermined beam diameter and a. marginal area to be blocked to obtain a permissible crosstalk value, the marginal area being concentric with the beam area, and having a predetermined diameter larger than the beam diameter, on the insertion position, the reflector and the blocking portion cover the marginal area of the second light beam, and on the removal position, at least a part of the blocking portion remains in the marginal area of the first light beam.

3. An optical switch, comprising:

a first input port for emitting a first light beam;

a second input port for emitting a second light beam intersecting the first light beam;

a first output port for receiving the second light beam;

a second output port for receiving the first light beam;

a reflector which is movable to be inserted in an intersecting area of an optical path of the first light beam and an optical path of the second light beam to stop on a predetermined insertion position, and to be removed from the insertion position to stop on a predetermined removal position, the reflector reflecting the first light beam to the first output port and reflecting the second light beam to the second output port when the reflector is disposed on the insertion position; and driving means for moving the reflector between the insertion position and the removal position; wherein a blocking portion is provided at an end area of the reflector with respect to an insertion direction and including first blocking means and second blocking means, the first blocking means preventing the first light beam, when the first light beam is incident thereon, from coupling to the first output port, the second blocking means preventing the second light beam, when the second light beam is incident thereon, from coupling to the second output port, each of the optical path of the first and second light beams has a beam area having a predetermined beam diameter and a marginal area, the marginal area being concentric with the beam area, and having a predetermined diameter larger than the beam diameter, on the insertion position, the reflector and the First blocking means of the blocking portion cover the marginal area for the first light and the reflector and the second blocking means of the blocking portion cover the marginal area to be blocked for the second light bean, and on the removal position, at least a pan of the first blocking means of the blocking portion remains in the marginal area for the first light beam and at least a part of the second blocking means remains in the marginal area for the second light beam.

4. The optical switch according to claim 1, wherein the optical path of the light beam further includes an area for obtaining a permissible insertion loss value, the area being concentric with the beam area, and having a predetermined diameter larger than the beam diameter and smaller than the diameter of the marginal area, and the blocking portion has a length $\alpha$ with respect to the insertion direction of the reflector, the length $\alpha$ having a maximum value $\alpha$ max obtained by dividing by 2 a difference (D2−D1) between a diameter D2 of the marginal area and a diameter D1 of the area for obtaining the permissible insertion loss value and multiplying an obtained value by $1/\sin\theta$ where $\theta$ represents an angle formed by an optical axis of the light beam incident on the reflector and the reflector.

5. The optical switch according to claim 2, wherein each of the optical path of the light beams further includes an area for obtaining a permissible insertion loss value, the area being concentric with the beam area and having a predetermined diameter larger than the beam diameter and smaller than the diameter of the marginal area, and the blocking portion has a length $\alpha$ with respect to the insertion direction of the reflector, the length $\alpha$ having a maximum value $\alpha$max obtained by dividing by 2 a difference (D2−D1) between a diameter D2 of the marginal area and a diameter D1 of the area for obtaining the permissible insertion loss value and multiplying an obtained value by $1/\sin\theta$ where $\theta$ represents an angle formed by an optical axis of the light beam incident on the reflector and the reflector.

6. The optical switch according to claim 3, wherein each of the optical path of the tight beams Thither includes an area for obtaining a permissible insertion loss value, the area being concentric with the beam area and having a predetermined diameter larger than the beam diameter and smaller than the diameter of the marginal area, and each of the blocking means has a length $\alpha$ with respect to the insertion direction of the reflector, the length $\alpha$ having a value obtained by dividing by 2 a difference (D2−D1) between a diameter D2 of the marginal area and a diameter D1 of the area for obtaining the permissible insertion loss value and multiplying an obtained value $1/\sin\theta$ where $\theta$ represents an angle formed by an optical axis of the light beam incident on the reflector and the reflector.

7. The optical switch according to claim 1, wherein on the removal position, a rear end of the blocking portion wit respect to the insertion direction is in contact with a boundary on a removal side of the area to be blocked.

8. The optical switch according to claim 2, wherein an the removal position, a rear end of the blocking portion with respect to the insertion direction is in contact with a boundary on a removal side of the area to be blocked for the first light beam.

9. The optical switch according to claim 3, wherein on the removal position, a rear end of the first blocking means of the blocking portion with respect to the insertion direction is in contact with a boundary on a removal side of the area to be blocked for the first light beam and a rear end of the second blocking means of the blocking portion with respect to the insertion direction is in contact with a boundary on a removal side of the area to be blocked for the second tight beam.

10. The optical switch according to claim 1, wherein the blocking portion has a reflective surface oriented so as not to reflect the light beam from the input port to the first output port.

11. The optical switch according to claim 10, wherein the reflective surface is oriented so as not to reflect the light beam from the input port to the input port.

12. The optical switch according to claim 2, wherein the blocking portion has a reflective surface oriented so as not to reflect the first tight beam from the first input port to the output port.

13. The optical switch according to claim 12, wherein the reflective surface is oriented so as not to reflect the first light beam from the first input port to the first input port.

14. The optical switch according to claim 1, wherein the reflector is rectangular, has one side making up the end with respect to the insertion direction, and has a reflective surface, the blocking portion is formed on the end of the reflector so as to protrude from the reflective surface of the reflector, and is shaped like a ridged protrusion triangular in cross section parallel to a plane including optical axes of the input port and the first and second output ports, the ridged protrusion triangular in cross section has two surfaces protruding from the reflective surface and one of the two surfaces is inclined with respect to the reflective surface such that the light beam from the input port is not incident on the first output port, and the other surface is inclined with respect to the reflective surface such that the light beam from die input port is not incident on the other surface.

15. The optical switch according to claim 14, wherein die one surface is oriented such that the light beam from the input port is not reflected to the input port.

16. The optical switch according to claim 1, wherein the light beam emitted from the input port is reflected by at least one additional reflector for the second output port and is coupled to the second output port, the additional reflector being disposed in a traveling direction of the light beam.

17. The optical switch according to claim 1 or 16, wherein the light beam reflected by the reflector is reflected by at least one additional reflector for the first output port and is coupled to the first output port, the reflector being disposed in the traveling direction of the light beam reflected.

18. The optical switch according to any one of claims 1 to 3, wherein the blocking portion is made of a material absorbing incident light 19. The optical switch according to claim 14, wherein
the light beam emitted from the input port is reflected by at least one additional reflector for the second output port and is coupled to die second output port, the additional reflector being disposed in a traveling direction of the light beam; and
the one of the two surfaces is parallel to a mirror surface of the additional reflector.

* * * * *